US011239898B1

(12) United States Patent
Chandra et al.

(10) Patent No.: US 11,239,898 B1
(45) Date of Patent: Feb. 1, 2022

(54) RELAYING DATA TO MULTIPLE ACCESS POINTS

(71) Applicant: Sprint Spectrum LP, Overland Park, KS (US)

(72) Inventors: Amrit Kumar Chandra, Ashburn, VA (US); Charles Manganiello, Paola, KS (US); David Zhijun Sun, Broadlands, VA (US); Jay R. Chernoff, Pawleys Island, SC (US); Kristian Kai Johns, Ashburn, VA (US); Liang Li, Darnestown, MD (US); Mayur Shirwadkar, Arlington, VA (US); Neehar Kulkarni, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 113 days.

(21) Appl. No.: 16/688,116

(22) Filed: Nov. 19, 2019

(51) Int. Cl.
*H04B 7/155* (2006.01)
*H04W 40/22* (2009.01)
*H04W 8/26* (2009.01)

(52) U.S. Cl.
CPC .............. *H04B 7/155* (2013.01); *H04W 8/26* (2013.01); *H04W 40/22* (2013.01)

(58) Field of Classification Search
CPC ...... H04L 37/155; H04W 40/22; H04W 8/26; H04W 84/047; H04W 88/04; H04W 76/11; H04W 76/15; H04W 92/04; H04B 7/15507; H04B 7/15; H04B 17/40; H04B 7/14; H04B 7/15542; H04B 7/155
See application file for complete search history.

(56) References Cited

U.S. PATENT DOCUMENTS

| 8,514,756 | B1* | 8/2013 | Ramachandra | ..... H04L 61/2069 370/310 |
| 8,891,540 | B2 | 11/2014 | Krishna et al. | |
| 10,091,683 | B1* | 10/2018 | Parihar | ............... H04L 61/2015 |
| 2009/0190521 | A1* | 7/2009 | Horn | ................... H04W 40/248 370/315 |
| 2010/0074267 | A1* | 3/2010 | Ladd | ................... H04L 12/2834 370/401 |
| 2010/0103845 | A1* | 4/2010 | Ulupinar | ........... H04L 29/12207 370/254 |
| 2010/0103862 | A1* | 4/2010 | Ulupinar | ........... H04L 29/12207 370/315 |
| 2010/0103863 | A1* | 4/2010 | Ulupinar | ........... H04W 36/0072 370/315 |

(Continued)

FOREIGN PATENT DOCUMENTS

| WO | WO-2012114527 A1 * | 8/2012 | .............. H04W 8/26 |
| WO | WO-2019105483 A1 * | 6/2019 | ............ H04W 40/22 |

*Primary Examiner* — Michael K Phillips

(57) ABSTRACT

Relaying data comprises assigning a first network address to a relay wireless device attached to an access node, wherein the relay wireless device is communicatively coupled to one or more wireless access points (WAPs); and instructing the relay wireless device to correspondingly assign one or more additional network addresses to the one or more WAPs, wherein the relay wireless device is configured to relay data between the access node and one or more end-user wireless devices attached to any of the one or more WAPs. Port NAT and DHCP are leveraged at the relay UE according to embodiments described herein.

20 Claims, 6 Drawing Sheets

(56) References Cited

U.S. PATENT DOCUMENTS

| | | | | |
|---|---|---|---|---|
| 2010/0279601 | A1* | 11/2010 | Phan | H04W 8/26 |
| | | | | 455/7 |
| 2011/0044249 | A1* | 2/2011 | Wu | H04W 76/11 |
| | | | | 370/328 |
| 2011/0182227 | A1* | 7/2011 | Rune | H04W 8/082 |
| | | | | 370/312 |
| 2012/0039240 | A1* | 2/2012 | Han | H04B 7/2606 |
| | | | | 370/315 |
| 2012/0140697 | A1* | 6/2012 | Chen | H04W 28/06 |
| | | | | 370/315 |
| 2013/0031271 | A1* | 1/2013 | Bosch | H04W 40/246 |
| | | | | 709/245 |
| 2016/0255539 | A1* | 9/2016 | Mizukoshi | H04W 28/08 |
| | | | | 370/329 |
| 2018/0270875 | A1* | 9/2018 | Hampel | H04W 74/0833 |
| 2018/0288823 | A1* | 10/2018 | Hampel | H04W 76/15 |
| 2020/0205067 | A1* | 6/2020 | Liu | H04W 56/0015 |

* cited by examiner

RELAYING DATA TO MULTIPLE ACCESS POINTS

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement relay nodes for relaying communication between a base station or donor access node, and an end-user wireless device. Combinations of wireless devices designated as relays (henceforth, "relay wireless devices") that are co-located with relay access points may be used at the edge of a coverage area of a donor access node to improve coverage and/or service, as well as in crowded areas having a high number of other wireless devices to increase the available throughput to the end-user wireless devices being relayed.

However, relay wireless devices are currently limited in their ability to serve multiple relay access points, partly due to limitations in a number of bearers available for use between the relay wireless devices and additional network nodes, such as access nodes and/or gateway nodes. This bottleneck becomes especially prevalent with the advent of 5G and high-bandwidth relay wireless devices that are unable to utilize their full potential due to the aforementioned limitations. For example, as new services are incorporated, the relay wireless device lacks the ability to terminate additional relay access points, since a limited number of usable bearers remain, whereas as new bearers are added, the current state of the art limits relay wireless devices from using the new bearers.

Overview

Exemplary embodiments described herein include systems, methods, and processing nodes for relaying data to multiple access points by assigning private network addresses to the multiple access points. For example, an exemplary method for relaying data includes assigning a first network address to a relay wireless device attached to an access node, wherein the relay wireless device is communicatively coupled to one or more wireless access points (WAPs), and instructing the relay wireless device to correspondingly assign one or more additional network addresses to the one or more WAPs, wherein the relay wireless device is configured to relay data between the access node and one or more end-user wireless devices attached to any of the one or more WAPs.

An exemplary system for relaying data includes a processing node, and a processor coupled to the processing node. The processor can be configured to perform operations including instructing a relay wireless device to assign private network addresses to each of one or more WAPs communicatively coupled to the relay wireless device, wherein the relay wireless device is configured to relay data between an access node to which the relay wireless device is attached and one or more end-user wireless devices attached to any of the one or more WAPs, and instructing the relay wireless device to map each private network address to at least one bearer set up between the relay wireless device and a core network node associated with the access node.

An exemplary processing node for relaying data is configured to perform operations including assigning a first network address to a relay wireless device attached to an access node, wherein the relay wireless device is communicatively coupled to one or more wireless access points (WAPs) and is configured to relay data between the access node and end-user wireless devices attached to the one or more WAPs, instructing the relay wireless device to correspondingly assign one or more additional network addresses to the one or more WAPs, and instructing the relay wireless device to route data addressed to a first end-user wireless device to the additional network address of the WAP to which the first end-user wireless device is attached.

DETAILED DESCRIPTION

In exemplary embodiments described herein, relays can be configured to relay data between an access node and one or more end-user wireless devices attached to the relay node. Relays may comprise a relay wireless device coupled to a relay access point (such as a small cell, home eNodeB, etc.), and are configured to relay data packets between the access node and an end-user wireless device attached to a wireless air interface deployed by the relay access point. When providing service to a relay node, the serving access node(s) may be referred to as donor access node(s), and any wireless connection between a donor access node and a relay wireless device may be referred to as a backhaul connection (or simply "backhaul"). Further, the donor access node may include an access node of any type, including macrocell access nodes such as Long-Term-Evolution (LTE) eNodeBs or 5G New Radio (NR) gNodeBs, mini access nodes, home eNodeBs or gNodeBs, etc.

Further, as described herein, relay wireless devices are configured to assign private network addresses to a plurality of wireless access points (WAPs) communicatively coupled to the relay wireless device. In other words, the disclosed embodiments introduce mechanisms to aggregate multiple relay nodes into a limited number of bearers assigned to relay wireless devices by using private network addressing, along with network address translation (NAT) in the relay wireless device. For example, while the current state of the art uses a single internet protocol (IP) address for a WAP that is provided when the relay attaches to the core network, the disclosed embodiments instruct the relay wireless device to perform dynamic host configuration protocol (DHCP) and terminate the IP addresses for the WAP connection. Thus, port NAT and private DHCP are leveraged on the relay node, such that multiple IP addresses can be assigned to corresponding multiple WAPs with port numbers being used to distinguish different traffic flows. This lets the relay wireless device distinguish which traffic flow belongs to which private IP address, and to route traffic flows to multiple end points (i.e. WAPs and the end-user wireless devices attached thereto). These and other embodiments are further described herein and with reference to FIGS. 1-7.

Figure 1:
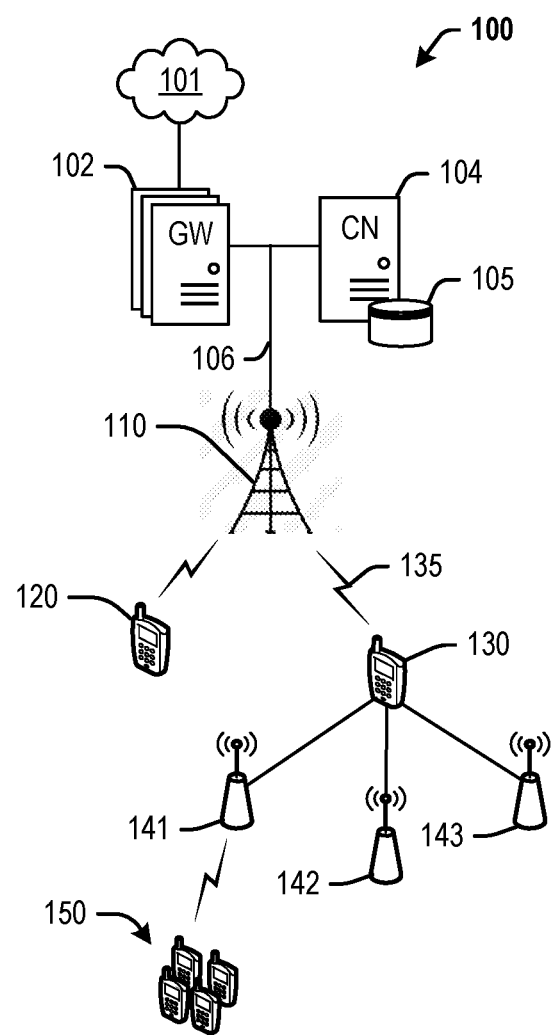
FIG. 1 depicts an exemplary system for relaying data.

FIG. 1 depicts an exemplary system 100 comprising a communication network 101, gateway 102, controller node 104, access node 110, wireless device 120, relay wireless device 130, wireless access points (WAPs) 141, 142, 143, and end-user wireless devices 150. Access node 110 is configured to deploy a radio air interface to which wireless device 120 and relay wireless device 130 can attach, by virtue of being located within a coverage area of access node 110. Further, relay node 130 is attached to WAPs 141, 142, 143, each of which can be configured to deploy another radio air interface to which end-user wireless devices can attach. For example, end-user wireless devices 150 are illustrated as being attached to WAP 141. Thus, relay wireless device 130, in combination with WAP 141, can be configured to relay data packets between access node 110 (hereinafter referred to as a "donor" access node) and end-user wireless devices 150. Thus, end-user wireless devices 150 that are outside a coverage area of donor access node 110 can access network services from donor access node 110 by virtue of being connected to WAP 141. Further, although only one donor access node 110, relay wireless device 130, WAPs 141-143, and end-user wireless devices 150 are illustrated in FIG. 1, one having ordinary skill in the art may conceive of any number of these elements in light of this disclosure, with the illustrated elements being depicted to clarify and simplify the described embodiments.

Further, a processing node within system 100 (for example, communicatively coupled to donor access node 110, controller node 104, relay wireless device 130, or any other network node) can be configured to perform operations including assigning a first network address to relay wireless device 130, and instructing the relay wireless device 130 to correspondingly assign one or more additional network addresses to each of WAPs 141-143. In an exemplary embodiment, wherein the first network address comprises an external network address, and the one or more additional network addresses comprise internal network addresses. The first network address may be assigned to the relay wireless device 130 by a network node in communication with the relay wireless device, such as access node 110, or a relay gateway from among gateways 102, or any other network node. In either case, the first network address is associated with to a domain associated with the network node assigning the first network address, and can be used by the core network elements (such as controller node 104, gateway(s) 102, or network 101), or by access node 110, to communicate with the relay wireless device 130. For example, access node 110 transmits data packets to (and receives data packets from) relay wireless device 130 via backhaul 135, and using the first network address of relay wireless device 130.

In contrast, the one or more additional network addresses assigned to each of WAPs 141-143 can be generated by the relay wireless device 130. In an exemplary embodiment, the one or more additional network addresses are addressed to a domain associated with the relay wireless device 130, and can include internal IP addresses (while the first network address may include an external IP address). Thus, the first (i.e. external) network address is presented to an external network node (or network 101) via the gateway(s) 102, while the internal IP addresses (assigned to each of WAPs 141-143) are used to communicate between relay wireless device 130 and WAPs 141-143, and the relay wireless device 130 can be configured to map the internal IP addresses to the external network address. Further, backhaul 135 can include one or more bearers set up between relay wireless device 130 and other network entities including access node 110, gateway(s) 102, and network 101. Thus, the relay wireless device can be instructed to perform network address translation (NAT) between the one or more additional network addresses of and the one or more bearers associated therewith. For example, performing NAT can include mapping the one or more additional network addresses of WAPs 141, 142, 143 to a bearer set up between the relay wireless device 130 and the access node 110, or to a bearer set up between the relay wireless device 130 and a core network entity, or to a bearer set up between the one or more end-user wireless devices 150 and a destination node in communication with network 101. In an exemplary embodiment, the relay wireless device 130 is assigned one or more bearers upon attaching to donor access node 110, and traffic flow templates (TFTs) can be transmitted via the one or more bearers to each of WAPs 141-143 allowing transmission of specific types of traffic. Thus, the one or more additional network addresses of each WAP 141-143 can be mapped to the one or more bearers and the TFTs.

Further, the relay wireless device 130 can be configured to route incoming data (via, for example, backhaul 135) to one of the one or more WAPs 141-143 based on the one or more additional network addresses assigned by the relay wireless device. The mapping can be enabled by using port numbers to distinguish traffic flows based on the TFTs. For example, each private network address of each WAP 141-143 is associated with a port number, and a routing table stored on the relay wireless device 130 including these associations. Further, a traffic flow delivered to relay wireless device 130 via backhaul 135 can include a port number while being addressed to the external network address of relay wireless device 130. Thus, mapping the incoming data can be performed using a routing table to lookup the internal network address associated with the TFT and correspondingly the port number, thereby ensuring that the incoming data is transmitted to the appropriate WAP (and, subsequently, to the end-user wireless devices attached thereto). Further, differential service code points (DSCP) marked on data packets can be used to map the data packets to specific bearers.

Thus, in an exemplary embodiment, system 100 is configured to relay data by instructing relay wireless device 130 to assign private network addresses to each of one or more WAPs 141-143 communicatively coupled to the relay wireless device 130, and to map each private network address to at least one bearer set up between the relay wireless device 130 and other network nodes within system 100, such as access node 110, gateway node(s) 102, etc. In an exemplary embodiment, a relay gateway node from among gateway node(s) 110 can be configured to assign the public network address to the relay wireless device 130. Further as described herein the relay wireless device 130 maintains a routing table enabling the relay wireless device 130 to map the private network addresses to at least one bearer, and to route data from the core network node (e.g. access node 110 and/or gateway node 102) to one of the one or more WAPs 141-143 based on matching a port number in the routing table to the private network address of the WAP 141-143.

Access node 110 can be any network node configured to provide communication between wireless devices and communication network 101, including standard access nodes such as a macro-cell access node, base transceiver station, a radio base station, an eNodeB device, an enhanced eNodeB device, a next generation or gigabit NodeB device (gNodeB) in 5G networks, or the like. In an exemplary embodiment, a macro-cell access node can have a coverage area in the range of approximately five kilometers to thirty-five kilometers and an output power in the tens of watts. Further, WAPs 141-143 may comprise any short range, low power, small-cell access nodes such as a microcell access node, a picocell access node, a femtocell access node, or a home eNodeB or gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106. Access node 110 may communicate with other access nodes (not shown), using a wireless link or a wired link such as an X2 link. Components of exemplary access node 110 and processing nodes coupled thereto, are further described with reference to FIGS. 2-3.

Wireless devices 120, 130, 150 may be any device, system, combination of devices, or other such communication platform capable of communicating wirelessly with access node 110 and/or WAPs 141-143 using one or more frequency bands deployed therefrom. Each of wireless devices 120, 130, 150 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay node 130 and wireless devices 120, 150. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication link 106 may include Si communication links. Other wireless protocols can also be used. Communication link 106 can be a direct link or might include various equipment, intermediate components, systems, and networks. Communication link 106 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), a relay SGW, a relay PGW, etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100. This information may be requested by or shared with access node 110 via communication links 106, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: gateway(s) 102, access node 110, relay wireless device 130, controller node 104, and/or network 101.

Figure 2:
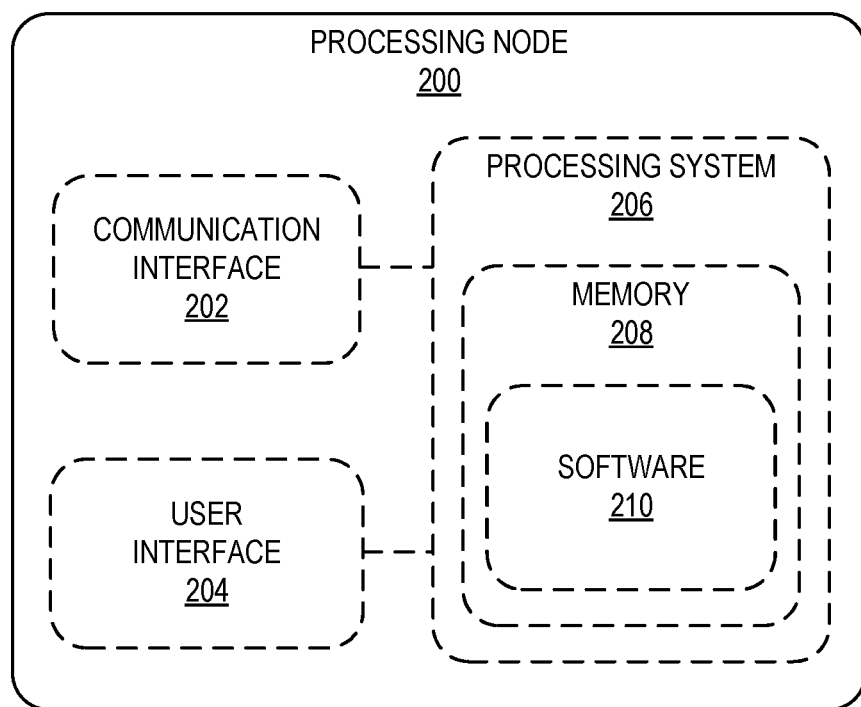
FIG. 2 depicts an exemplary processing node for relaying data.

FIG. 2 depicts an exemplary processing node 200 for mitigating interference. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the interference mitigation operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for assigning a first network address to a relay wireless device attached to an access node, wherein the relay wireless device is communicatively coupled to one or more wireless access points (WAPs), and instructing the relay wireless device to correspondingly assign one or more additional network addresses to the one or more WAPs, wherein the relay wireless device is configured to relay data between the access node and one or more end-user wireless devices attached to any of the one or more WAPs.

In another exemplary embodiment, software 212 can include instructions for instructing a relay wireless device to assign private network addresses to each of one or more WAPs communicatively coupled to the relay wireless device, wherein the relay wireless device is configured to relay data between an access node to which the relay wireless device is attached and one or more end-user wireless devices attached to any of the one or more WAPs, and instructing the relay wireless device to map each private network address to at least one bearer set up between the relay wireless device and a core network node associated with the access node.

In another exemplary embodiment, software 212 can include instructions for assigning a first network address to a relay wireless device attached to an access node, wherein the relay wireless device is communicatively coupled to one or more wireless access points (WAPs) and is configured to relay data between the access node and end-user wireless devices attached to the one or more WAPs, instructing the relay wireless device to correspondingly assign one or more additional network addresses to the one or more WAPs, and instructing the relay wireless device to route data addressed to a first end-user wireless device to the additional network address of the WAP to which the first end-user wireless device is attached.

Figure 3:
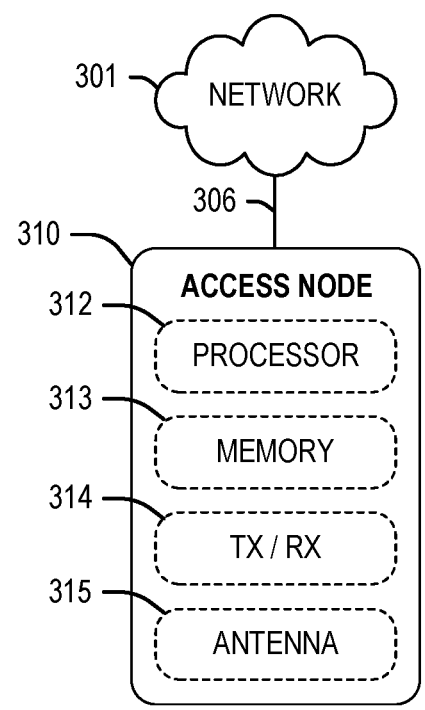
FIG. 3 depicts an exemplary access node for relaying data.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, transceiver 313, and antenna 314. Processor 311 executes instructions stored on memory 312, while transceiver 313 and antenna 314 enable wireless communication with wireless device 330 and relay node 340. Further, antenna 314 may include an array of antennae that are configured to deploy a radio air interface over one or more wireless sectors, form beams within these sectors, employ multiple-input-multiple-output (MIMO), etc.

Figure 4:
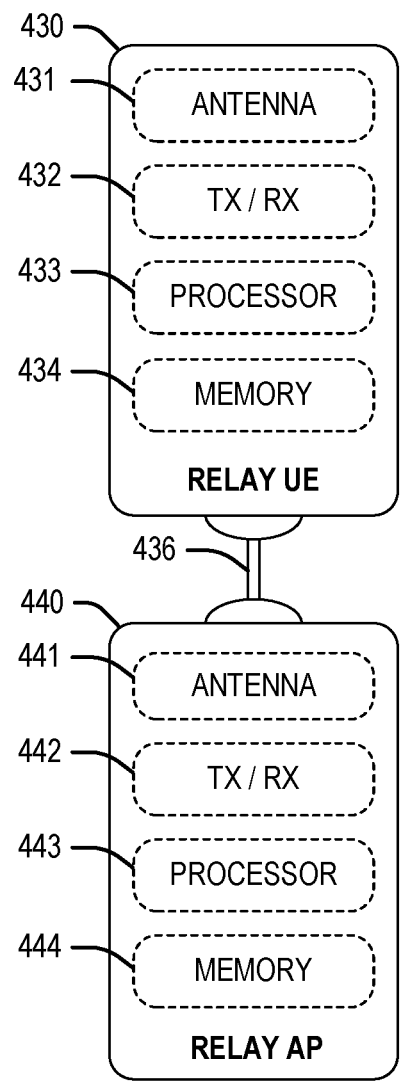
FIG. 4 depicts an exemplary relay node comprising a relay wireless device and a relay access point.

FIG. 4 depicts an exemplary relay node comprising a relay wireless device (UE) 430 and a relay access point (AP) 440. Relay wireless device 430 is illustrated as comprising an antenna 431 enabling communication with one or more donor access nodes, transceivers 432, a processor 433, and a memory 434 for storing instructions that enable relay wireless device 430 to perform operations described herein. In some embodiments, relay wireless device 430 is referred to as a customer premise equipment (CPE), which includes any stationary LTE and/or 5G NR wireless device having a stronger computational & RF capability versus standard wireless devices, as well as a directional antenna and a dedicated power supply, enabling relay wireless device 430 to efficiently provide resources to end-user wireless devices via relay access point 440. Consequently, relay access point 440 may be co-located with relay wireless device 430, and is connected to relay wireless device 430 via a communication interface 436. Communication interface 436 may be any interface that enables direct communication between relay wireless device 430 and relay access point 440, such as USB, FireWire, Ethernet, or any other serial, parallel, analog, or digital interface.

In operation, relay wireless device 430 may be configured to relay network services from donor access nodes to end-user wireless devices via relay access point 440. Relay wireless device 430 may begin to function as a relay wireless device by sending a message to donor access nodes to indicate to donor access nodes that wireless device 430 is functioning as a relay wireless device. In some embodiments, relay wireless device 430 can request to send a buffer status report to donor access nodes, which can grant this request in a conventional manner. Relay wireless device 430 may respond to the grant by sending a short buffer status report. This short buffer status report is associated with a logical channel group that indicates the buffer status report is communicating the status of relay wireless device 430 as a relay, and thus is not asking for additional resource allocations (like a 'conventional' buffer status report would indicate). In other words, when relay wireless device 430 responds with a buffer status report for the 'special' logical channel group, it means that the buffer status report is not actually reporting the status of a buffer. Rather, this buffer status report indicates that the wireless device is now functioning as a relay. Once status of relay wireless device 430 is established, relay wireless device 430 may instruct relay access point 440 to start accepting connection requests from one or more end-user wireless devices. Further, relay access point 440 is illustrated as comprising an antenna 441 and transceiver 442 for enabling communication with end-user wireless device, processor 443, and a memory 444 for storing instructions that are executed by processor 443. In some embodiments, relay access point 440 may be a home eNodeB or a home gNodeB. Moreover, although only one transceiver is depicted in each of relay wireless device 430 and relay access point 440, additional transceivers may be incorporated in order to facilitate communication across interface 436 and other network elements.

In an embodiment, the relay node depicted in FIG. 4 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to end-user wireless devices. Likewise, RF signals received from end-user wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/resassembly). In other words, relay node depicted herein performs demodulation and decoding of the received RF signals (either uplink or downlink), processes received data, then encodes, modulates, and transmits the data to a wireless device.

Figure 5:
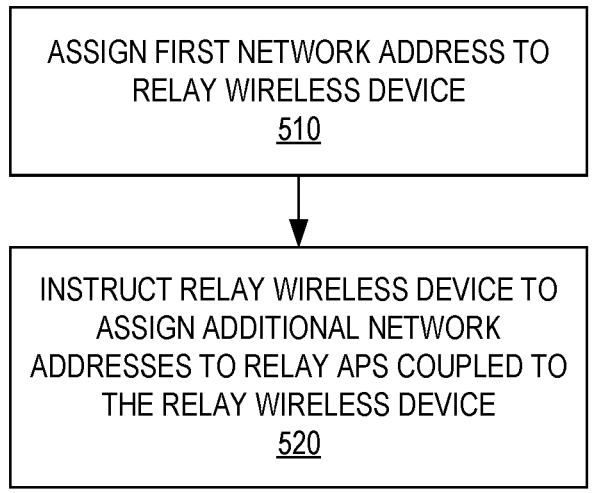
FIG. 5 depicts an exemplary method for relaying data.

FIG. 5 depicts an exemplary method for relaying data. The method of FIG. 5 may be implemented by a processing node communicatively coupled to one or more donor access nodes, relay nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a first network address is assigned to a relay wireless device and, at 520, the relay wireless device is instructed to assign additional network addresses to relay access points (APs) coupled to the relay wireless device. For example, an access node is configured to deploy a radio air interface to which the relay wireless device can attach, with the relay wireless device being further coupled to WAPs that are configured to deploy another radio air interface to which end-user wireless devices can attach. Thus, the relay wireless device, in combination with one or more WAPs, can be configured to relay data packets between a donor access node and the end-user wireless devices. Further, the first network address comprises an external network address, and the one or more additional network addresses comprise internal network addresses. The first network address may be assigned to the relay wireless device by a network node in communication with the relay wireless device, such as an access node or a relay gateway, or any other network node.

In either case, the first network address is associated with to a domain associated with the network node assigning the first network address, and can be used by the core network elements to communicate with the relay wireless device. In contrast, the one or more additional network addresses assigned in 520 can be generated by the relay wireless device and are addressed to a domain associated with the relay wireless device. Thus, the relay wireless device can be instructed to perform network address translation (NAT) between the one or more additional network addresses of and the one or more bearers associated therewith.

Figure 6:
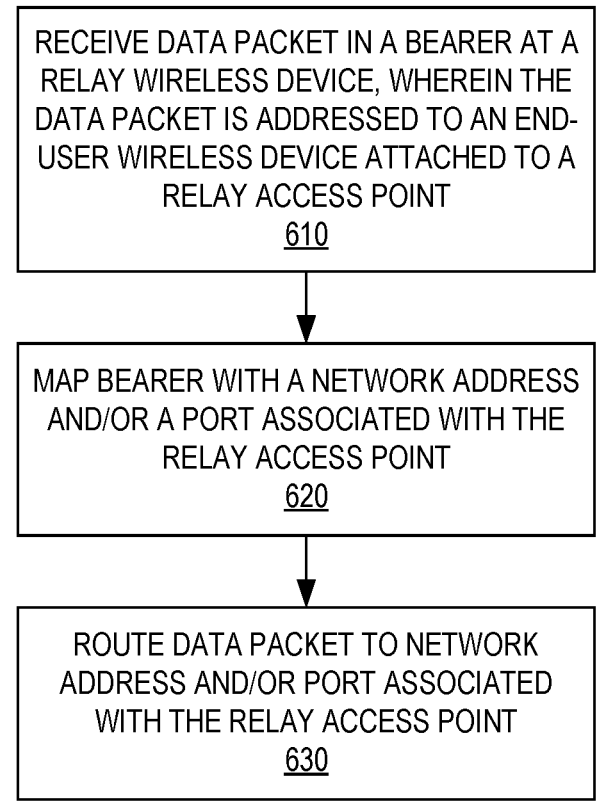
FIG. 6 depicts another exemplary method for relaying data.

FIG. 6 depicts an exemplary method for relaying data. The method of FIG. 5 may be implemented by a processing node communicatively coupled to one or more donor access nodes, relay nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, data packets are received in a bearer at a relay wireless device and addressed to an end-user wireless device attached to a relay access point. For example, the data packets may be received at a first network address assigned to the relay wireless device. As described above and with reference to FIG. 5, the relay wireless device, in combination with one or more WAPs, can be configured to relay data packets between a donor access node and the end-user wireless devices. Then, at 620, the bearer is mapped to a network address and/or port associated with the relay access point (WAP). For example, while the first network address comprises an external network address, the one or more additional network addresses of the WAPs comprise internal network addresses generated by the relay wireless device and are addressed to a domain associated with the relay wireless device. Thus, the relay wireless device can be instructed to perform network address translation (NAT) between the one or more additional network addresses of and the one or more bearers associated therewith. Performing NAT can include mapping the one or more additional network addresses of the WAPs to a bearer set up between the relay wireless device and the access node, or to a bearer set up between the relay wireless device and a core network entity, or to a bearer set up between the one or more end-user wireless devices and a destination node.

Finally, at 630, the relay wireless device can be configured to route the incoming data to one of the one or more WAPs based on the one or more additional network addresses assigned by the relay wireless device. The mapping can be enabled by using port numbers to distinguish traffic flows. For example, each private network address of each WAP is associated with a port number, and a routing table stored on the relay wireless device including these associations with specific TFTs that are assigned to each of the one or more WAPs. Further, incoming traffic flows delivered to the relay wireless device and addressed to the external network address of the relay wireless device can be mapped to each private IP address. Thus, routing the incoming data can be performed using a routing table to lookup the internal network address and port number associated with the TFT, thereby ensuring that the incoming data is transmitted to the appropriate WAP (and, subsequently, to the end-user wireless devices attached thereto).

Figure 7:
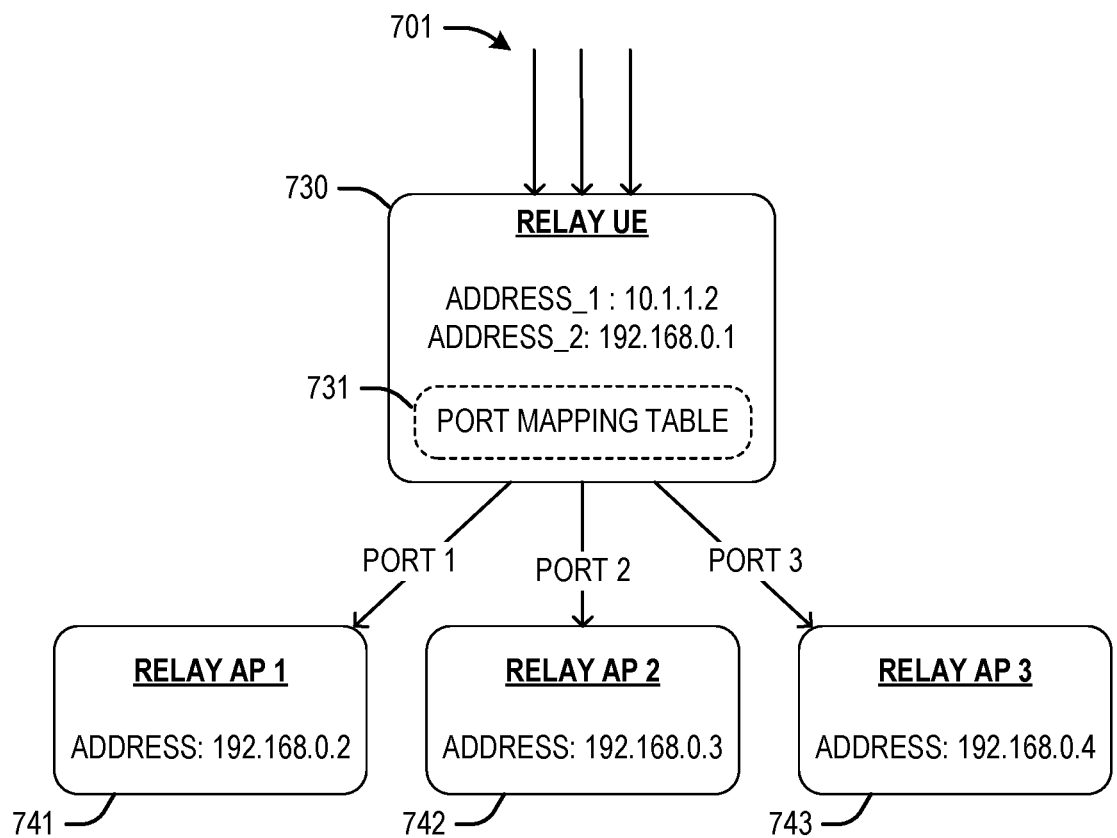
FIG. 7 depicts exemplary assignments of private network addresses used to relay data to multiple relay access points.

FIG. 7 depicts exemplary assignments of private network addresses by relay wireless device 730 used to relay data to multiple relay access points 741, 742, 743. The relay wireless device 730 can be configured to relay data packets 701 between an access node (not shown) and an end-user wireless device (not shown) attached to a wireless air interface deployed by the relay access points 741-743. As described herein, the relay wireless device 730 can be configured to assign private network addresses to WAPs 741-743. For example, while relay wireless device 730 is assigned a public IP address 10.1.1.2, it can further be configured to utilize DHCP, assigning itself a private IP address 192.168.0.1, and assigning additional private IP addresses in the same domain to each WAP 741, 742, 743. Thus, multiple WAPs 741-743 can be aggregated into a limited number of bearers assigned to relay wireless device 730 by using private network addressing, along with network address translation (NAT) in the relay wireless device. For example, port NAT can be used to direct the data 701 to each specific port 1, 2, 3 respectively for each WAP 741, 742, 743, by using port mapping table 731 to map the internal IP addresses to the bearers containing data flows 701. This lets the relay wireless device 730 distinguish which traffic flow belongs to which private IP address, and to route traffic flows to each WAP 741-743 (and, consequently, to the end-user wireless devices attached thereto).

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for relaying data, the method comprising:
assigning a first network address to a relay wireless device attached to an access node, wherein the relay wireless device is communicatively coupled to one or more wireless access points (WAPs);
instructing the relay wireless device to correspondingly assign one or more private network addresses to the one or more WAPs; and
instructing the relay wireless device to map each private network address to at least one bearer set up between the relay wireless device and a core network node associated with the access node,
wherein the relay wireless device is configured to relay data between the access node and one or more end-user wireless devices attached to any of the one or more WAPs.

2. The method of claim 1, wherein:
the first network address comprises an external network address, and
the one or more private network addresses comprise internal network addresses.

3. The method of claim 2, wherein the first network address is assigned to the relay wireless device by a network node in communication with the relay wireless device.

4. The method of claim 3, wherein the first network address is addressed to a domain associated with the network node.

5. The method of claim 2, wherein the first network address is used by the access node to communicate with the relay wireless device.

6. The method of claim 2, wherein the one or more private network addresses are generated by the relay wireless device.

7. The method of claim 6, wherein the one or more private network addresses are addressed to a domain associated with the relay wireless device.

8. The method of claim 1, further comprising instructing the relay wireless device to perform network address translation (NAT) between the one or more private network addresses and one or more bearers.

9. The method of claim 8, wherein performing NAT comprises mapping the one or more private network addresses to a bearer set up between the relay wireless device and the access node.

10. The method of claim 8, wherein performing NAT comprises mapping the one or more private network addresses to a bearer set up between the one or more end-user wireless devices and a destination node.

11. The method of claim 1, further comprising instructing the relay wireless device to route incoming data to one of the one or more WAPs based on the one or more private network addresses assigned by the relay wireless device.

12. The method of claim 11, wherein routing the incoming data is performed using a routing table.

13. A system for relaying data, the system comprising:
a processing node; and
a processor coupled to the processing node, the processor being configured to perform operations comprising:
- instructing a relay wireless device to assign private network addresses to each of one or more WAPs communicatively coupled to the relay wireless device, wherein the relay wireless device is configured to relay data between an access node to which the relay wireless device is attached and one or more end-user wireless devices attached to any of the one or more WAPs; and
- instructing the relay wireless device to map each private network address to at least one bearer set up between the relay wireless device and a core network node associated with the access node.

14. The system of claim 13, wherein the core network node comprises a gateway node, the gateway node being configured to assign a public network address to the relay wireless device.

15. The system of claim 13, wherein the relay wireless device maintains a routing table enabling the relay wireless device to map the private network address to the at least one bearer.

16. The system of claim 15, wherein the relay wireless device is further configured to route data from the core network node to one of the one or more WAPs based on matching a port number in the routing table to the private network address of the WAP.

17. A processing node for relaying data, the processing node comprising at least a processor and a memory, the memory for storing instructions that enable the processor to perform operations comprising:
- assigning a first network address to a relay wireless device attached to an access node, wherein the relay wireless device is communicatively coupled to one or more wireless access points (WAPs) and is configured to relay data between the access node and end-user wireless devices attached to the one or more WAPs;
- instructing the relay wireless device to correspondingly assign one or more private network addresses to the one or more WAPs; and
- instructing the relay wireless device to map each private network address to at least one bearer set up between the relay wireless device and a core network node associated with the access node.

18. The processing node of claim 17, wherein the core network node comprises a gateway node, the gateway node being configured to assign a public network address to the relay wireless device.

19. The processing node of claim 17, wherein the relay wireless device maintains a routing table enabling the relay wireless device to map the private network address to the at least one bearer.

20. The processing node of claim 19, wherein the relay wireless device is further configured to route data from the core network node to one of the one or more WAPs based on matching a port number in the routing table to the private network address of the WAP.

* * * * *